United States Patent [19]

Snyder et al.

[11] Patent Number: 5,453,069
[45] Date of Patent: Sep. 26, 1995

[54] WORKING ROLLER WITH VARIABLE DEFLECTION CONTROL

[75] Inventors: Dennis L. Snyder, Mineral City; Brentin H. Myers, Tuscarawas, both of Ohio

[73] Assignee: Snyder Manufacturing Inc., Dover, Ohio

[21] Appl. No.: 299,909

[22] Filed: Sep. 1, 1994

[51] Int. Cl.$^6$ .................................................. B21B 13/02
[52] U.S. Cl. .................... 492/5; 492/4; 492/7; 492/20
[58] Field of Search ........................... 492/2, 7, 18, 20, 492/4, 5

[56] References Cited

U.S. PATENT DOCUMENTS

| | | |
|---|---|---|
| 2,950,507 | 8/1960 | Keyser . |
| 3,606,645 | 9/1971 | Vignon . |
| 3,638,292 | 2/1972 | Gaghan . |
| 4,183,128 | 1/1980 | Marchioro ..................... 492/7 |
| 4,327,468 | 5/1982 | Küsters et al. ................ 492/7 |
| 4,510,865 | 4/1985 | Molinatto . |
| 4,583,273 | 4/1986 | Schnyder et al. .............. 492/2 |
| 4,624,184 | 11/1986 | Katz et al. ..................... 492/4 |
| 4,691,420 | 9/1987 | Schiel et al. .................. 492/4 |
| 4,709,571 | 12/1987 | Güttinger ...................... 492/2 |
| 4,741,079 | 5/1988 | Quehen ........................ 492/20 |
| 4,815,183 | 3/1989 | Bondetti ....................... 492/7 |
| 4,848,119 | 7/1989 | Pav et al. ..................... 492/2 |
| 4,875,261 | 10/1989 | Nishida et al. ................ 492/2 |
| 5,123,150 | 6/1992 | Schiel . |
| 5,127,141 | 7/1992 | Roerig et al. ................. 492/7 |

Primary Examiner—Irene Cuda
Assistant Examiner—Marc W. Butler
Attorney, Agent, or Firm—Hudak & Shunk Co.

[57] ABSTRACT

A working roller for applying pressure to a web of material interposed between the working roller and an opposing working surface includes a generally tubular roll-shell with bearings at each end thereof, a pair of stationary journals for supporting the roll-shell for rotation about its longitudinal axis, a stationary internal support structure, and a plurality of internal rollers which bear upon the inner wall of the roll-shell and are mounted to the internal support structure by a plurality of individually adjustable thrust-supports for controlling the outer contours of the roll-shell. The invention allows greater control of the outer contours of the roll-shell to compensate for localized, longitudinally asymmetrical deviations from the desired pressure distribution or spacing between the working roller and an opposing working surface or to permit predetermined, non-uniform pressure distributions or spacings between the working roller and an opposing working surface.

13 Claims, 2 Drawing Sheets

WORKING ROLLER WITH VARIABLE DEFLECTION CONTROL

FIELD OF THE INVENTION

This invention relates to working rollers which are used in conjunction with an opposing surface to apply pressure to a web of material interposed therebetween. More particularly, the invention relates to a working roller having a plurality of pressure adjustment means for effectively controlling the shape of the working roller and for more completely and accurately controlling the amount of pressure exerted on the web of material across the length of the roller.

BACKGROUND OF THE INVENTION

Working rollers for applying pressure to a web of material are utilized in a variety of process applications such as for calendering any of various webs, or continuous sheets, of paper, cloth, plastic, etc.; textile carding; gravure; printing; drying; roll coating; and other operations. A common problem associated with the use of such working rollers is maintenance of the desired amount of pressure across the entire width of the web of material. In most cases it is desired to maintain a constant pressure between the working roller and the opposing surface along the entire line of contact between the working roller and the web of material. However, it should be understood that for certain applications it might be desirable to apply variable pressure across the width of the web of material. For example, in calendering or roll coating operations it might be desirable to provide the web of material with edges or margins which are thinner or thicker than the central portion of the web, in which case the pressure between the working roller and the opposing surface, such as a platen or back-up roller, is adjusted to be greater, or lower, at that portion of the line of contact between the working roller and the web which is coincident with the edges of the web. As another example, it might be desirable for aesthetic or other reasons to provide a calendered or roll coated plastic web having a wavy appearance due to a roughly sinusoidally variable thickness across its width.

Even in the simplest situation where it is desired to maintain uniform pressure across the entire line of contact between the working roller and the web, various factors often make it difficult to achieve and maintain the desired amount of pressure across the entire width of the web contacting the working roller. Such factors include, for example, the effect of the weight of the roller, particularly as the length of the roller increases, which causes the roller to bow or deflect longitudinally near its center. Other factors which have an effect on the pressure distribution across the line of contact between the working roller and the web of material include uneven wear of the outer surface of the roll-shell, and temperature variations of the roll-shell along the line of contact between roller and the web. It is now generally recognized that the maintenance of a desired pressure distribution along the entire line of contact between the working roller and the web can be achieved most effectively, particularly for longer rollers, by means of a working roller having internal means for controlling the deflection thereof.

Known means for controlling the deflection or outer contours of a working roller have generally included the provision of one or more hydraulic pressure chambers which are arranged between an outer cylindrical roll-shell and a fixed axle, or the provision of one or more inner rollers attached to a stationary inner beam which can be urged toward the inner wall of an outer cylindrical roll-shell. Such means have generally been designed to provide increased outward deflection along the line of contact between the working roller and the opposing surface between which the web of material passes in order to compensate for longitudinally symmetrical bowing effects attributable to the weight of the roller or to thermal effects at the margins of the web, and thereby achieve or re-establish a constant line of force across the width of the web. One disadvantage with the conventional means for controlling the deflection or contours of the outer cylindrical roll-shell is that they generally do not allow for non-symmetrical adjustments such as at individual zones along the line of contact between the working roller and the web of material interposed between the working roller and an opposing surface where uneven wear or other unpredictable phenomena have caused random localized deflections. Other disadvantages with known means for controlling roller deflection include their inability to allow for adjustments of varying magnitude or direction in adjacent zones along the line of contact between the working roller and the web of material. For example, the known adjustment means have not generally permitted a negative pressure adjustment at a selected portion of the line of contact between a working roller and a web of material interposed between the working roller and an opposing surface while simultaneously allowing for positive pressure adjustments at adjacent areas along the line of contact. Accordingly, the limited deflection controllability provided by known apparatuses is usually insufficient to effectively compensate for unexpected or unpredictable deviations from a desired pressure distribution across the line of contact between the working roller and a web of material interposed between the roll-shell and the back-up roller or other opposing surface, especially when such deviations are asymmetric with respect to the longitudinal mid-point of the roller. Moreover, because the known working rollers having deflection adjustment means are primarily designed to compensate for bowing or other symmetrical deflections and re-establish a uniform pressure distribution across the line of contact between the working roller and the web of material to apply uniform pressure along the width of a web of material, they cannot generally be adjusted or adapted to maintain a desired non-uniform pressure distribution such as when a web having a predetermined transversely varying thickness is desired.

Accordingly, there exists a heretofore unfulfilled need for a working roller with variable deflection control means, wherein greater control of the outer contours of the roll-shell along the line of contact between the working roller and a web of material interposed between the roll-shell and an opposing surface is achievable to compensate for various unexpected and unpredictable deviations from a desired pressure distribution along said line of contact. More specifically, there is a need for such a deflection controllable working roller which is capable of compensating for localized, longitudinally asymmetrical deviations which can often occur, especially after extended use of the working roller. Additionally, a deflection controllable working roller which is adaptable for maintaining a predetermined non-uniform pressure distribution along the line of contact between the working roller and a web of material, for processing a web having a desired non-uniform profile such as to achieve a decorative effect, would be desirable.

SUMMARY OF THE INVENTION

This invention provides a working roller for applying pressure to a web of material interposed between the working roller and an opposing working surface, wherein a higher degree of control over the outer contours of the working roller and the pressure distribution along the line of contact between the working roller and a web of material interposed between the roll-shell and the opposing working surface is possible, as compared with previous working rollers. The working roller of the invention includes a generally hollow, tubular, rotatable roll-shell journalled at each end to a stationary journal shaft, a stationary internal support structure extending substantially along the central longitudinal axis of the roll-shell and supported at each end by the stationary journals, and a plurality of individually adjustable thrust-support means, each of which carries at least one internal roller which bears upon the inner cylindrical surface of the roll-shell to allow greater control over the outer contours of the roll-shell and over the pressure distribution along the line of contact between the roll-shell and a web of material interposed between the roll-shell and an opposing working surface than was heretofore possible. The internal rollers and thrust-support means can be arranged in opposing pairs which are individually adjusted to deflect the roll-shell circumferentially without bending the roller length-wires.

The working roller of the invention allows for compensation of various deviations from a desired pressure distribution along the line of contact between the working roller and a web of material, such as deviations which can occur due to bending or flattening of a backup roller. The invention is also adaptable for maintaining a desired non-uniform pressure distribution along the line of contact between the working roller and a web of material interposed between the roll-shell and an opposing working surface, such as to produce a web having a non-uniform profile.

The adjustable working roller of the invention can also be utilized in combination with a second roller or working surface which is spaced from the working roller by a predetermined distance, which can optionally vary along the length of the roller, for applications wherein the material or web passing between the working roller and the second roller or working surface is shaped or smoothed, but not subjected to significant pressure. Such applications may, for example, include the application of a hot melt adhesive to a web or sheet-like substrate.

The working roller of the invention is readily amenable to computer control, and can be used as part of a system for continuously monitoring and maintaining product quality (i.e., maintaining specified dimensions within precise limits). For example, automated measuring means can be provided to accurately gauge the thicknesses ross the width of a product which has passed between the working roller and an opposing working surface. The measurements can be transmitted to a computer-control means which can individually adjust the roller and trust-support means in accordance with a prescribed algorithm to compensate for deviations from specified dimensional limits for the product.

The opposing working surface for the working roller can include, for example, a conventional back-up roller, a flat working surface, a second working roller in accordance with the invention, etc.

DESCRIPTION OF THE PREFERRED EMBODIMENT

Figure 1:
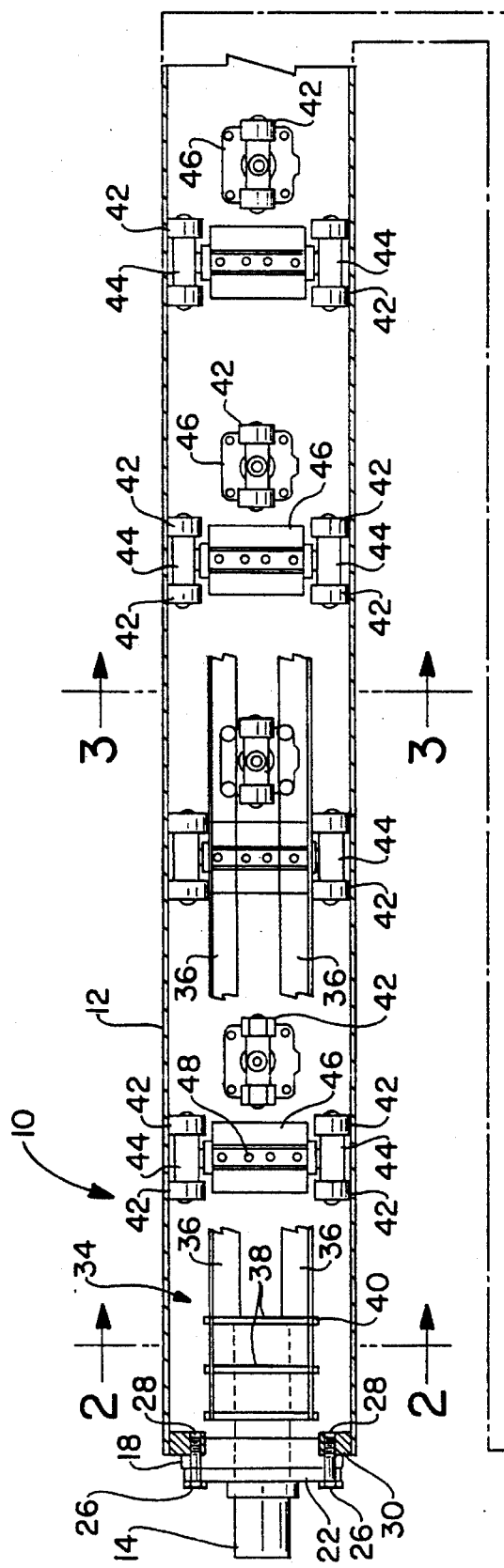
FIG. 1 is an elevational view of a working roller in accordance with the principles of the invention with portions partially broken away and in section.
Figure 1:
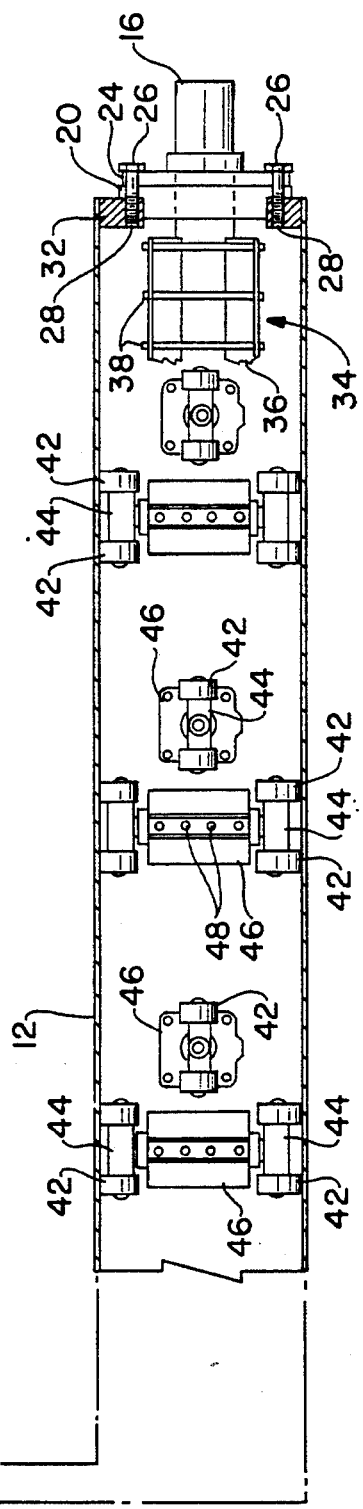

An illustrative example in accordance with a preferred embodiment of the invention is shown in FIG. 1. The working roller, generally indicated by reference numeral 10, includes a generally tubular roll-shell 12 which is rotatably mounted on a pair of stationary journals 14, 16. Any of various conventional bearing means 18, 20 and associated bearing lubricant seal means 22, 24 are secured at each end of the tubular roll-shell 12, such as by bolts 26 which are threaded into bores 28 provided in bearing mounting rings 30, 32. The bearing mounting rings 30, 32 are welded or otherwise secured to the tubular roll-shell 12. The bearings 18, 20 provide means for rotatably mounting the roll-shell 12 onto the stationary journals 14, 16. The stationary journals 14, 16 are supported by a frame (not shown) or other support means of conventional design.

The journals 14, 16 preferably extend at least partially into the hollow interior of the roll-shell 12 to provide means for supporting a stationary internal support structure generally indicated by reference numeral 34. The stationary internal support structure 34 extends longitudinally through the hollow interior of the tubular roll-shell 12 from journal 14 to journal 16 and is generally radially disposed within the roll-shell 12 such that its central longitudinal axis is coincident with the central longitudinal axis, or rotational axis, of the roll-shell 12. While the stationary internal support structure 34 is preferably a separate structural framework that is fixedly supported by journals 14 and 16, a single continuous shaft extending through the entire length of the tubular roll-shell 12 and outward from each end through the bearing means 18, 20 and seal means 22, 24 can also be utilized, in which case the journals 14, 16 and stationary internal support structure could be integrally formed together. A stationary internal support structure which is comprised of a separate structural framework which is fixedly secured to and supported by journals 14, 16 is preferred because it is generally less expensive to fabricate and repair, if damaged.

Figure 2:
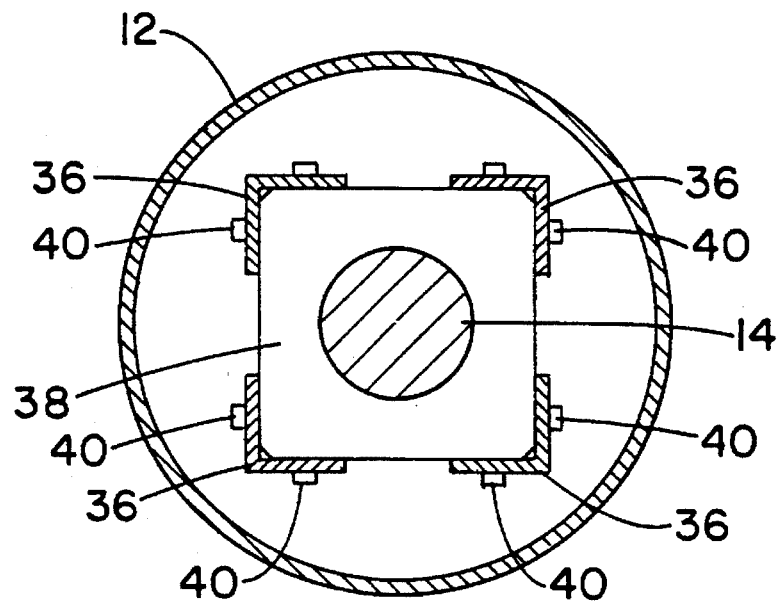
FIG. 2—2 is a transverse cross-section view along lines 2—2 of FIG. 1.
Figure 3:
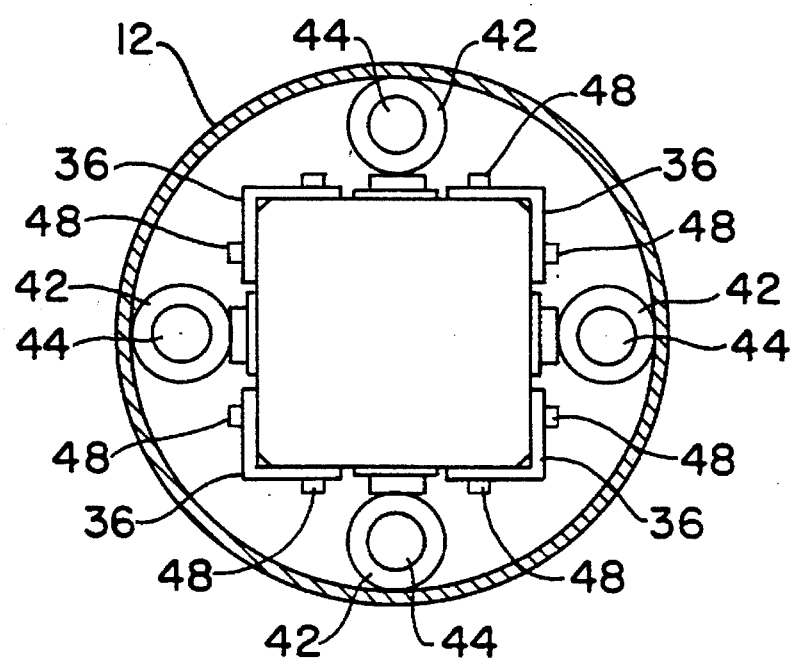
FIG. 3 is a transverse cross-section view along lines 3—3 of FIG. 1.

The stationary internal support structure 34 can be fixed to journals 14, 16 by any of a variety of suitable means. In accordance with the preferred embodiment of the invention, as best illustrated in FIG. 2 and 3, the internal support structure is comprised of a plurality of angle members 36 which are supported by, and in fixed relationship to, stationary journals 14, 16 through a plurality of mounting plates 38. Mounting plates 38 are generally square-shape metal plates having a central opening through which journals 14 or 16 pass. The mounting plate 38 is fixed to journals 14 or 16 by any suitable means, such as by welding or suitable fasteners including bolts, screws, rivets and the like. Angle members 36 are fixed to the mounting plates 38 by any suitable fastening means such as by welding or by use of fasteners 40, which can be bolts, screws, rivets or the like.

A plurality of internal rollers 42 are mounted within the hollow, tubular roll-shell 12 in fixed relationship relative to the stationary internal support structure 34. Each of the internal rollers 42 is generally cylinder-shaped and journalled about a central opening to an axle 44 to allow rotation about the central longitudinal axis of the roller 42. The rotational axis of each of the internal rollers 42 is substantially parallel with the rotational axis of the roll-shell 12, and the outer cylindrical surface of each of the rollers 42 is generally maintained in abutment with the inner cylindrical surface of the tubular roll-shell 12 by thrust-support means 46 secured to the stationary internal support structure 34 by any suitable means of securement, such as by welding or by using fasteners, including bolts, screws, rivets or the like. The plurality of internal rollers 42 are spaced apart from one another along the length of the roller to allow for a high degree of control over the pressure distribution along the line of contact between the working roller 10 and a web of material interposed between the working roller and the opposing surface. The longitudinal spacings between the internal rollers can be uniform or non-uniform depending on the particular application for which the working roller is being used, although uniform spacings are generally preferred to allow for greater flexibility of control over the outer contours of the roll-shell 12.

The thrust-support means 46 is generally any suitable mechanical device which can be used to adjustably urge the outer cylindrical surface of the roll-shell 12 with varying amounts of force as desired or required for a particular application or as needed to adjust or compensate for deviations from a desired pressure distribution along a line of contact between the working roller 10 and a web of material interposed between the working roller and an opposing surface. Examples of suitable thrust-support means include motor operated drive screws, and pneumatic or hydraulic lifter cylinder type assemblies, with pneumatic and hydraulic lifter cylinder type assemblies being preferred. Electrical conductors, hydraulic fluid conduits, or pneumatic fluid conduits can be passed through one or more axial bores provided through either or both of the stationary journals 14, 16 and to air or pneumatic fluid ports 48 on the individual thrust-support means 46 to power the same. Most preferably, each of the thrust-support means 46 is provided with a separate power supply, or other means, for controlling each of the thrust-support means individually and independent of the others to provide a high degree of control over the outer contours of the roll-shell 12, and over the pressure distribution along the line of contact between the working roller 10 and a web of material interposed between the working roller and the opposing surface.

In accordance with the preferred embodiment, the internal rollers 42 and thrust-support means 46 are arranged in diametrically opposing pairs, wherein opposing rollers are substantially in the same transverse plane relative to the longitudinal direction of the roll-shell 12, and are separated from one another by an angle of approximately 180 degrees as measured around the circumference of the roll-shell. In other words, the internal rollers 42 and thrust-support means 46 are preferably arranged in opposing pairs so that a line connecting the point of contact between an internal roller and the roll-shell 12, and the point of contact between an associated opposing internal roller and the roll-shell, passes approximately through the longitudinal axis of the roll-shell. By positioning the internal rollers 42 and thrust-support means 46 in diametrically opposing pairs, it is possible to minimize or reduce the amount of bending forces or deflection imposed on the internal support structure 34 for any particular amount of force applied between the internal rollers 42 and the roll-shell 12.

Even more preferred is the particular arrangement shown in FIGS. 1 and 3, wherein two opposing thrust-support means 46 for pairs of diametrically opposing internal roller 42 are structurally coupled (i.e. connected together) to one another, either directly (as shown in the drawings) or indirectly (such as though load bearing members connecting opposing thrust-support members together), so that forces transmitted radially inwardly from an internal roller toward the longitudinal axis of the roll-shell 12 can be balanced by oppositely directed counter-forces transmitted radially inwardly toward the longitudinal axis of the roll-shell from a diametrically opposing roller. By structurally coupling diametrically opposing internal rollers 42 and their associate thrust-support means 46, it is possible to minimize or reduce the amount of bending stress or deflection forces imposed on internal support structure 34, such that the internal support structure can serve primarily to prevent displacement of the rollers 42 and associated thrust-support means 46 along the longitudinal direction of the roll-shell 12, and whereby a lighter, less expensive internal support structure can be utilized. Also, by having the internal rollers and thrust support means arranged in diametrically opposing pairs, it is possible to adjust each of an opposing pair of internal rollers equally, so as to cause circumferential deflection of the working roller 10.

In accordance with another preferred aspect of the invention, one or more of the internal rollers 42 are, in addition to being spaced apart along the longitudinal direction of the roll-shell 12, also angularly displaced along the inner circumference of the roll-shell with respect to at least one other of the internal rollers. That is to say, a radius from the rotational axis of the roll-shell 12 to the line of contact between the roll-shell and one of the internal rollers 42 is preferably at an angle with respect to a radius from the rotational axis of the roll-shell to the line of contact between the roll-shell and at least one of the other internal rollers. Arranging at least one of the rollers at a different angle relative to at least one other roller has the advantage of allowing a portion of the roll-shell 12, along the line of contact between the roll-shell 12 and a web of material interposed between the roll-shell and an opposing surface, to be lifted or drawn away from the opposing working surface to reduce the amount of pressure applied to the opposing surface and to a web of material interposed between the working roller 10 and the opposing surface, at a selected portion of said line of contact. The ability to lift a portion of roll-shell 12 away from the opposing working surface permits greater flexibility in the manner by which adjustments to the pressure distribution along the line of contact between the roll-shell and a web of material interposed between the roll-shell and an opposing working surface can be achieved. For example, if all of the internal rollers 42 were arranged at the same angle such that they all applied pressure to the inner cylindrical wall of the roll-shell in an area at or immediately adjacent to the vicinity of the line of contact between the roll-shell 12 and a web of material interposed between the roll-shell and the opposing working surface, and if it was desired or necessary to reduce the pressure at only a relatively short segment of said line of contact, it would be necessary to increase the pressure or deflect the roll-shell outwardly by adjusting all the internal rollers except the one nearest to the area where the pressure is to be decreased, and reduce the overall force applied between the roll-shell and the opposing working surface accordingly. By contrast, if there was an internal roller 42 positioned within a plane transverse to the longitudinal direction of the roll-shell and which is at, or near to, that portion of the line of contact between the roll-shell 12 and a web of material interposed between the roll-shell and the opposing working surface where it is desired to reduce the pressure; and that internal roller was sufficiently angularly displaced relative to a radius from the rotational axis of the roll-shell to the line of contact between the roll-shell and a web of material interposed between the roll-shell and an opposing working surface, then it would be possible to achieve the desired adjustment by merely increasing the force imposed on the roll-shell by the aforementioned angularly displaced internal roller.

A good balance amongst controllability of roll-shell contour, flexibility of control, simplicity of design and economy is achieved by arranging about half of the internal rollers 42 so that at least a plurality of the internal rollers contact the inner cylindrical surface of the roll-shell 12 at or near to the line of contact between the working roller 10 and a web of material interposed between the roll-shell and an opposing working surface (hereafter referred to as the zero degree position), with at least a plurality of the remaining internal rollers 42 being arranged at about a 90 degree angle (hereafter referred to as the orthogonal position) along the circumferential inner surface of the roll-shell relative to the internal rollers 42 which contact the inner cylindrical surface of the roll-shell 12 at or near said line of contact. The expression "at or near to the line of contact between the working roller 10 and the web of material interposed between the roll-shell and an interposing working surface" means an angular displacement of less than about 5, 10 or 20 degrees along the circumferential inner surface from said line of contact. An angle of about 90 degrees, as it relates to the relative angular positioning of the internal rollers about the circumferential inner surface of the roll-shell, means an angle of from about 70, 80 or 85 degrees to about 95, 100 or 110 degrees. It is also preferred that the zero degree positioned internal rollers 42 and the orthogonal positioned internal rollers be distributed approximately symmetrically, or in a substantially regular pattern, along the length of the roll-shell 12. For example, a preferred arrangement could involve alternating internal rollers 42 and their associated thrust-support means 46 between the zero position and the orthogonal position, with the spacing between alternating internal rollers and their associated thrust-support means being approximately equal.

A suitable angular displacement of the internal rollers along the inner circumference of the roll-shell to allow a portion of roll-shell 12 to be lifted or drawn away from an opposing working surface is one wherein at least one of the internal rollers 42 is angularly displaced from at least one other internal roller by from about 10 to 170 degrees, more desirably from 20 to 160 degrees, and preferably from about 30 to 150 degrees, with about 90 degrees being most preferred. Additionally, it is possible to realize the benefits of the invention by arranging any number of individually adjustable internal rollers at any number of different angles. For example, one or a plurality of diametrically opposing pairs of internal rollers could be arranged in the zero position, another or plurality of others at the 60 degree position, and a third or third set of diametrically opposing rollers can be arranged at a 120 degree position.

Each thrust-support means can carry a single internal roller, two internal rollers (as shown in the drawings illustrating the most preferred embodiment), or more if desired.

In summary, the important features of the invention include the use of a plurality of individually adjustable thrust-support means 46 each of which carries at least one internal roller 42 which bears upon the inner cylindrical surface of the roll-shell to allow greater control over the outer contours of the roll-shell and over the pressure distribution along the line of contact between the roll-shell and a web of material interposed between the roll-shell and an opposing working surface. Other advantageous features include the arrangement of internal rollers 42 and associated thrust-support means in diametrically opposing pairs to reduce bending forces and deflecting of the internal support structure 34, structural coupling of diametrically opposing internal rollers and their associated thrust-support means to further reduce the amount of bending stress and deflection forces imposed on the internal support structure whereby the internal support structure can serve primarily to prevent displacement of the rollers along the longitudinal direction of the roll-shell 12, and angular displacement of certain internal rollers along the inner circumference of the roll-shell with respect to other internal rollers to allow greater flexibility in the manner by which adjustment to the pressure distribution along the line of contact between the roll-shell and a web of material interposed between the roll-shell and an opposing working surface can be achieved.

While in accordance with the patent statutes the best mode and preferred embodiment has been set forth, the scope of the invention is not limited thereto, but rather by the scope of the attached claims.

What is claimed is:

1. A working roller for applying pressure to a web of material interposed between the working roller and an opposing working surface, comprising:

a substantially tubular roll-shell having an inner circumferential surface and a bearing means at each end thereof;

a pair of journals for supporting said roll-shell through said bearing means for rotation about a central longitudinal axis of said roll-shell;

an internal support structure extending substantially along said central longitudinal axis of said tubular roll-shell and being supported by said journals; and a plurality of pairs of opposed internal rollers mounted to said internal support structure by a plurality of axially aligned thrust-support means intervening between members of said pairs providing an opposing force to each said opposed roller, said forces being balanced, each of said internal rollers being generally cylindrical and rotatable about a central longitudinal axis thereof which is substantially parallel to the longitudinal axis of said roll-shell, each of said thrust-support means being individually adjustable to directly or indirectly urge an outer surface of said internal rollers against an interior surface of said tubular roll-shell with a desired amount of force, whereby the outer contours of the tubular roll-shell and pressure distribution along a line of contact between said working roller and a web of material interposed between said working roller and said opposing surface are controlled.

2. A working roller according to claim 1, wherein at least one pair of said internal rollers is spaced apart from at least one other pair of internal roller along the length of the roller.

3. A working roller according to claim 2, wherein at least two of said internal rollers are arranged to diametrically oppose each other, such that said pairs of diametrically opposing internal rollers are in substantially the same transverse plane relative to the central longitudinal axis of the tubular roll-shell.

4. A working roller according to claim 3, wherein the individual internal rollers of at least one of said pair of diametrically opposing internal rollers are structurally coupled to one another, whereby forces transmitted radially inwardly from an internal roller toward the central longitudinal axis of the roll-shell are balanced by oppositely directed forces transmitted radially inwardly toward the central longitudinal axis of the tubular roll-shell from a diametrically opposing roller.

5. A working roller according to claim 2, wherein at least one pair of said internal rollers is angularly displaced along the inner circumferential surface of said tubular roll-shell relative to at least one other pair of internal rollers.

6. A working roller according to claim 2, wherein at least a plurality of said internal rollers are arranged so that they contact the inner surface of the roll-shell at or near to the line of contact between the working roller and a web of material interposed between said tubular roll-shell and an opposing working surface.

7. A working roller according to claim 6, further comprising at least a plurality of pair of internal rollers which are arranged at an angle of about 90 degrees along the inner circumferential surface of the roll-shell relative to the plurality of pairs of internal rollers arranged so that they contact the inner surface of the roll-shell at or near to said line of contact between the working roller and a web of material interposed between a roll-shell and an opposing working surface.

8. A working roller according to claim 1, wherein said thrust support means is a hydraulic or pneumatic cylinder assembly.

9. A working roller having controllable outer contours, comprising:

a tubular roll-shell having an inner circumferential surface which is supported for rotary movement about its longitudinal axis;

a stationary structure extending longitudinally through said tubular roll-shell;

one or more pairs of diametrically opposing internal rollers mounted within said tubular roll-shell and supported by said stationary structure, said rollers having an outer cylindrical surface and being supported for rotary movement about an axis generally parallel with said longitudinal axis of said tubular roll-shell, said pairs of diametrically opposing rollers being spaced apart along the longitudinal axis within said roll-shell; and structurally coupled, individually adjustable axially aligned thrust means between said diametrically opposing internal rollers of each of said pairs for urging the outer cylindrical surface of said pairs of diametrically opposing rollers against the inner circumferential surface of said tubular roll-shell by the application of selected balanced forces.

10. A working roller according to claim 9, wherein at least one of said pairs of diametrically internal opposing rollers is angularly displaced along the inner circumferential cylindrical surface of said tubular roll-shell relative to at least one other of said pairs of diametrically opposing internal rollers.

11. A working roller according to claim 10, wherein said angular displacement is between about 10° and 170°.

12. A working roller according to claim 11, wherein at least a plurality of said pairs of diametrically opposing internal rollers are arranged so that they contact the inner circumferential surface of said tubular roll-shell at or near a line of contact between said working roller and a web of material interposed between said tubular roll-shell and an opposing working surface.

13. A working roller according to claim 9, wherein said urging means is a hydraulic or pneumatic cylinder assemble.

* * * * *